(12) United States Patent
Varanka (10) Patent No.: US 12,191,664 B2
(45) Date of Patent: Jan. 7, 2025

(54) POWER SYSTEM AND METHOD

(71) Applicant: WATTIUM OY, Haukipudas (FI)

(72) Inventor: Kauko Varanka, Haukipudas (FI)

(73) Assignee: WATTIUM OY, Haukipudas (FI)

( * ) Notice: Subject to any disclaimer, the term of this patent is extended or adjusted under 35 U.S.C. 154(b) by 0 days.

(21) Appl. No.: 17/772,991

(22) PCT Filed: Oct. 30, 2020

(86) PCT No.: PCT/FI2020/050715
§ 371 (c)(1),
(2) Date: Apr. 28, 2022

(87) PCT Pub. No.: WO2021/084163
PCT Pub. Date: May 6, 2021

(65) Prior Publication Data
US 2024/0154416 A1 May 9, 2024

(30) Foreign Application Priority Data

Oct. 30, 2019 (FI) .................................... 20195930

(51) Int. Cl.
*H02J 3/00* (2006.01)
*H02J 3/32* (2006.01)
*H02J 3/38* (2006.01)

(52) U.S. Cl.
CPC .............. *H02J 3/007* (2020.01); *H02J 3/32* (2013.01); *H02J 3/381* (2013.01);
(Continued)

(58) Field of Classification Search
CPC .... H02J 3/007; H02J 3/32; H02J 3/381; H02J 2203/10; H02J 2300/10; H02J 2300/22; H02J 2300/28
See application file for complete search history.

(56) References Cited

U.S. PATENT DOCUMENTS

2014/0036553 A1* 2/2014 Permuy .................. H02J 3/381
363/34
2015/0025725 A1 1/2015 Uchida
(Continued)

FOREIGN PATENT DOCUMENTS

EP 2482444 8/2012
JP 2002016486 1/2002
(Continued)

OTHER PUBLICATIONS

Written Opinion in connection to International Application No. PCT/FI2020/050715, dated Feb. 3, 2021. (7 pages).
(Continued)

*Primary Examiner* — Lincoln D Donovan
*Assistant Examiner* — Alex W Lam
(74) *Attorney, Agent, or Firm* — Meunier Carlin & Curfman LLC (57) ABSTRACT

The invention relates to a system and method for supplying AC output power to at least one desired AC load. Values of electrical currents and/or voltages are measured by an energy measurement device within the system and an AC output power demand of the AC load is determined. An inverter unit inverts DC power received via the internal DC bus to AC power to supply AC output power to the connected AC load. The invention further comprises that the controller controls the electrical energy consumption of the inverter unit based on the AC output power demand.

18 Claims, 3 Drawing Sheets

(52) U.S. Cl.
CPC ....... *H02J 2203/10* (2020.01); *H02J 2300/10* (2020.01); *H02J 2300/22* (2020.01); *H02J 2300/28* (2020.01)

(56) References Cited

U.S. PATENT DOCUMENTS

| | | | |
|---|---|---|---|
| 2015/0102667 A1 | 4/2015 | Zhao et al. | |
| 2019/0052094 A1* | 2/2019 | Pmsvvsv | H02J 3/32 |
| 2020/0044444 A1 | 2/2020 | Allert et al. | |
| 2020/0052493 A1* | 2/2020 | Kolhatkar | H02J 3/46 |

FOREIGN PATENT DOCUMENTS

| | | |
|---|---|---|
| JP | 212020626 | 2/2012 |
| WO | 20180188872 | 10/2018 |

OTHER PUBLICATIONS

International Search Report in connection to International Application No. PCT/FI2020/050715, dated Feb. 3, 2021. (4 pages).

Office Action in connection to Finnish U.S. Appl. No. 20/195,930, dated Jun. 1, 2020. (5 pages).

Search Report in connection to Finnish U.S. Appl. No. 20/195,930, dated Jun. 1, 2020. (2 pages).

* cited by examiner

POWER SYSTEM AND METHOD

CROSS REFERENCE TO RELATED APPLICATIONS

This application is a United States National Phase Patent Application of International Patent Application Number PCT/FI2020/050715, filed on Oct. 30, 2020, which claims the benefit of priority to Finnish National Patent Application number FI 20195930, filed on Oct. 30, 2019, both of which are incorporated by reference herein in their entireties.

TECHNICAL FIELD

The invention generally relates to a system for supplying power, and more specifically to an off-grid or stand-alone system and method for supplying power. The invention relates also to a computer program product that utilises the method.

BACKGROUND

Generally, there are different off-grid/stand-alone systems for supplying electric power. In known systems typically a gasoline or diesel engine driven generator/alternator, a.k.a. an engine generator, provides voltage output, wherein generator/alternator produced electric power can be supplied either directly to the output load or alternatively indirectly via charging batteries. In addition, known systems include controller unit, i.e. controller, configured to battery monitoring, controlling the inverter and controlling whether supply voltage output from the generator/alternator or batteries or from the both sources. In certain systems a controlling unit is further used to remote accessing of the system. To reduce fuel consumption of the engine generator, some known systems may additionally include solar panels or other renewable energy sources connected into battery charging circuitry. Systems that are used to supply electric power for home appliances comprise also a DC/AC inverter to convert battery voltage into AC voltage. Typically, such a system is built from separate components as above. Some systems are integrated into one large enclosure weighting several hundreds of kilograms.

EP2482444A2 discloses a hybrid engine and battery generator and a method of operating the same. The generator is controlled to operate in at least three modes: a battery-only mode, a battery charging mode, and a boost mode. The generator automatically switches between the modes based on battery level and load demand.

There are however some disadvantages relating to the known prior art, such as DC/AC inverter consumes high amount of energy, even if no load, due to significant idle current, i.e. the amount of electrical power required to keep the inverter ready to produce electricity on demand, of the inverter. Therefore, in time when there is only low demand of the AC load connected to the systems for supplying electric power load, i.e. low AC output power demand, and hence no need to use engine generator, a good part of the battery capacity of the system is still supplied to that idle current. A known solution takes this account by reserving an extra battery capacity posing problems to operators of the systems due to bulkier sizes and weighs of such systems. Another solution is to switch the DC/AC inverter on only temporarily to sense if there is voltage load. This solution will cause serious problems with modern appliances, for instance such devices or appliances that cycle on and off within certain period. Still another typical solution is to manually switch off the DC/AC inverter when there is no voltage load, not a practical solution either.

SUMMARY

An object of the invention is to alleviate and eliminate the problems relating to the known prior art. The object is achieved by the features of independent claims.

Preferred embodiments of the invention are disclosed in the appended dependent claims. It is further noted that the invention relates to all possible combinations of preferred embodiments unless explicitly otherwise stated. Moreover, other ways, means and components are also contemplated including but not limited to the present examples.

The invention relates to a method for supplying AC output to at least one desired AC load, wherein the method comprises a step wherein values of electrical currents and/or voltages within the system are measured by an energy measurement device. The method further comprises a step wherein the measured values from the energy measurement device are taken as an input and an AC output power demand of the AC load connected to an inverter unit is determined. The method further comprises a step wherein DC power received via the internal DC bus is inverted to AC power by the inverter unit to supply AC output power. The internal DC bus (13) is configured to electric transfer within the system. The method further comprises that the controller accomplishes a step wherein the electric power consumption of the inverter unit is controlled based on the AC output power demand.

In a preferred embodiment the method comprises a step wherein at least one energy source and/or a battery circuitry is selected to provide the DC power to be transferred via the internal DC bus to the inverter unit. This selecting is made based on the AC output power demand and/or status of the battery circuitry.

In a preferred embodiment the method comprises a step wherein at least one energy source is provided, which energy source is an engine generator. When running the engine generator, i.e. using the engine generator to provide electric power, the method step comprises steps wherein:
the engine generator converts kinetic energy into electric power;
a charging unit rectifies the electric power generated by the engine generator to the DC power; and
the rectified DC power originated from the engine generator is transferred to one or both of the battery circuitry and the inverter unit.

In a preferred embodiment the method comprises a step wherein at least one energy source connector to attach an AC input from the electric grid and/or at least one energy source selected from a solar panel, wind turbine, hydroelectric power generator or the like, respectively, is provided, to provide electric power. The method step comprises steps wherein:
electric power received via the energy source connector is transferred to the charging unit;
the charging unit rectifies electric power originated via the energy source connector is rectified to the DC power; and
the rectified DC power originated via the energy source connector is transferred to one or both of the battery circuitry and the inverter unit.

In a preferred embodiment the controller accomplishes a method step wherein AC output power mode of the inverter unit is selected based on the AC output power demand. The selecting of the AC output mode is made between low-level mode and high-level mode on the basis of a threshold value. The low-level mode is selected when the AC output power demand is below the threshold value and the high-level mode is selected when the AC output power demand is above the threshold value.

In a preferred embodiment the controller accomplishes a method step wherein the threshold value is adjusted.

In a preferred embodiment the controller accomplishes a method step wherein a switching element is provided. The switching element is controlled by the controller. In the method step the switching element accomplishes a step wherein the switching element connects the low-level inverter on the AC output line and disconnects the high-level inverter from the AC output line, when the low-level mode is selected. In the method step the switching element further accomplishes a step wherein the switching element connects the high-level inverter on the AC output line and disconnects the low-level inverter from the AC output line, when the high-level mode is selected.

In a preferred embodiment the switching element accomplishes a method step wherein the switching element switches on the low-level inverter and switches off the high-level inverter, when the low-level mode is selected. In the method step the switching element further accomplishes a step wherein the switching element switches on the high-level inverter and switches off the low-level inverter, when the high-level mode is selected.

In a preferred embodiment the method step wherein measuring electrical currents and/or voltages within the system, the method step comprises a measurement from at least one measurement selected from the battery circuitry, the energy source, the internal DC bus, the inverter unit, the switching element or the AC output line.

In addition, the invention relates a power system for supplying AC output power to at least one desired AC load. The system comprises an internal DC bus configured to electric transfer within the system. The system further comprises an inverter unit coupled to the internal DC bus, which inverter unit is configured to invert DC power to AC power to supply the AC output power. The system further comprises an energy measurement device coupled to the internal DC bus, wherein the energy measurement device is configured to measure values of electrical currents and/or voltages within the system. The system further comprises a controller configured to take measured values from the energy measurement device as an input for determining an AC output power demand of the AC load connected to the inverter unit. The controller is further configured to control the electric power consumption of the inverter unit based on the AC output power demand.

In a preferred embodiment the system further comprises at least one energy source which is an engine generator configured to provide electric power by conversion from produced kinetic energy.

In a preferred embodiment the system further comprises at least one energy source connector configured to attach an AC input from the electric grid and/or at least one energy source selected from a solar panel, wind turbine or hydroelectric power generator, respectively, to provide electric power.

In a preferred embodiment the system comprises a charging unit coupled to at least one energy source and/or the AC input. The charging unit is configured to rectify from at least one energy source and/or the AC input transferred electric power to the DC power and supply the rectified DC power to the internal DC bus.

In a preferred embodiment the controller is configured to take measured values from the energy measurement device as an input for controlling the engine generator and/or for controlling power and voltage of the rectified DC power.

In a preferred embodiment the system further comprises a battery circuitry. The battery circuitry comprises at least one battery connector configured to attach at least one battery, respectively, to charge and discharge the battery circuitry.

In a preferred embodiment the internal DC bus is configured to electric transfer between the inverter unit, the battery circuitry and the charging unit.

In a preferred embodiment the controller is further configured to control the inverter unit to operate at least in a low-level mode and in a high-level mode.

In a preferred embodiment the inverter unit comprises a low-level inverter configured to invert the DC power to the AC power in the low-level mode, which low-level mode is configured to be used when the AC output power demand is below threshold value. The inverter unit further comprises a high-level inverter configured to invert the DC power to the AC power in the high-level mode, which high-level mode is configured to be used when the AC output power demand is above the threshold value.

In a preferred embodiment the system further comprises a switching element configured to be controlled by the controller. The switching element is further configured to connect the low-level inverter on the AC output line, when the low-level mode is selected, and disconnect by the switching element the low-level inverter from the AC output line (24), when the high-level mode is selected. The switching element is further configured to connect the high-level inverter on the AC output line, when the high-level mode is selected, and disconnect by the switching element the high-level inverter from the AC output line, when low-level mode is selected. The AC output line is configured to transfer the inverted AC output power to the connected AC load 30.

In a preferred embodiment the switching element is further configured to switch on the low-level inverter, when low-level mode is selected, and switch off by the switching element the low-level inverter, when the high-level mode is selected. Additionally or alternatively, the switching element is further configured to switch on by the switching element the high-level inverter, when the high-level mode is selected, and switch off by the switching element the high-level inverter, when low-level mode is selected.

In addition, the invention relates a computer program product on a non-transitory media for supplying AC output power to at least one desired AC load comprising instructions configured to, when executed on at least one processor, to perform the method steps according the method.

The computer program product comprising instructions is configured to, when executed on at least one processor, the system to perform the method steps according to the invention, which method steps comprise receiving measurement results of electrical currents and/or voltages of the system from the energy measurement device. The instructions further comprise determining an AC output power demand of the AC load connected to an inverter unit and controlling an inverter unit in inverting of the DC power received via the internal DC bus to the AC power to supply AC output power. The instructions further comprise that the controller accomplishes a step of controlling the electrical energy consumption of the inverter unit based on the AC output power demand.

In a preferred embodiment the instructions further comprise instructions wherein an AC output mode of the inverter unit is selected based on the AC output power demand, wherein the selecting of the AC output mode is made between low-level mode and high-level mode on the basis of a threshold value. The low-level mode is selected when the AC output power demand is below the threshold value and the high-level mode is selected when the AC output power demand is above the threshold value.

The advantages of the invention are, for example, that the system is optimized for minimum fuel consumption, even if no renewable energy source is available.

Another advantage of the invention is that capacity of the battery circuitry and hence to the power system attached batteries' sizes and amount of the attached batteries can be reduced compared to the systems in the art. This enables a compact and light-weight power system to supply continuous AC output.

Another advantage of the invention is that it enables continuous AC supply to a desired AC load much longer without the usage of an engine generator than the systems in the art.

Still another advantage of the invention is that it is fully integrable into an existing system for supplying AC output power.

BRIEF DESCRIPTION OF THE DRAWINGS

In the following the invention will be described in detail, by way of examples, with reference to the accompanying drawings in which.

DETAILED DESCRIPTION

The embodiments in the following detailed description are given as examples only and someone skilled in the art can carry out the basic idea of the invention also in some other way than what is described in the description. Most embodiments can be actualised in a variety of combinations with other embodiments. Though the description may refer to a certain embodiment or embodiments in several places, this does not imply that the reference is directed towards only one described embodiment or that the described characteristic is usable only in one described embodiment. The individual characteristics of a plurality of embodiments may be combined and new embodiments of the invention may thus be provided.

Figure 1:
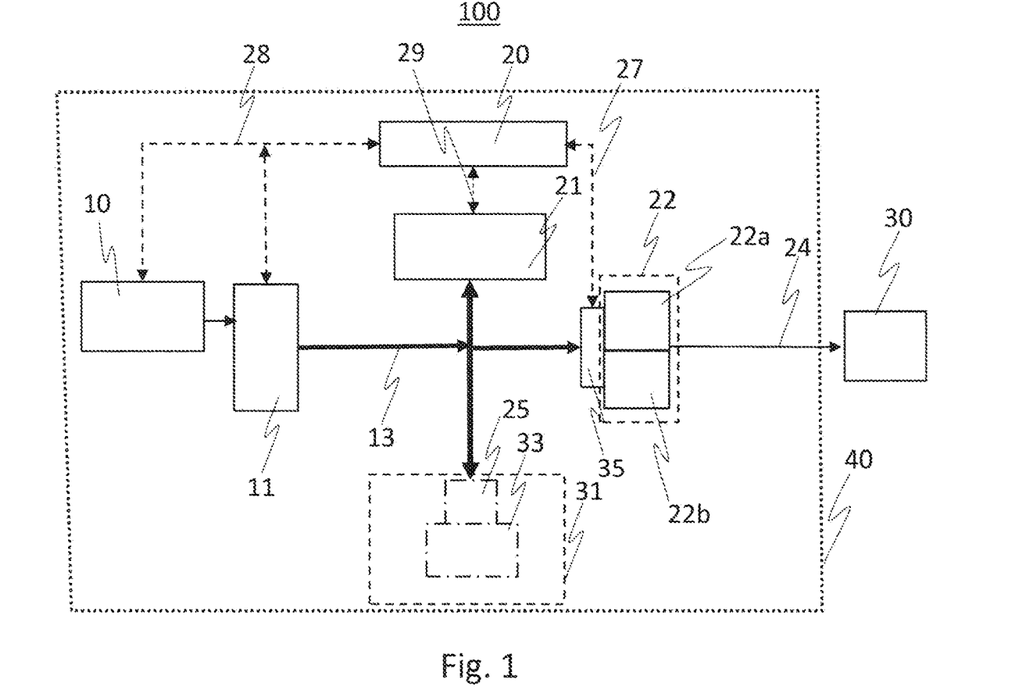
FIGS. 1-3 show some functional elements of an exemplary system according to the invention.
Figure 2:
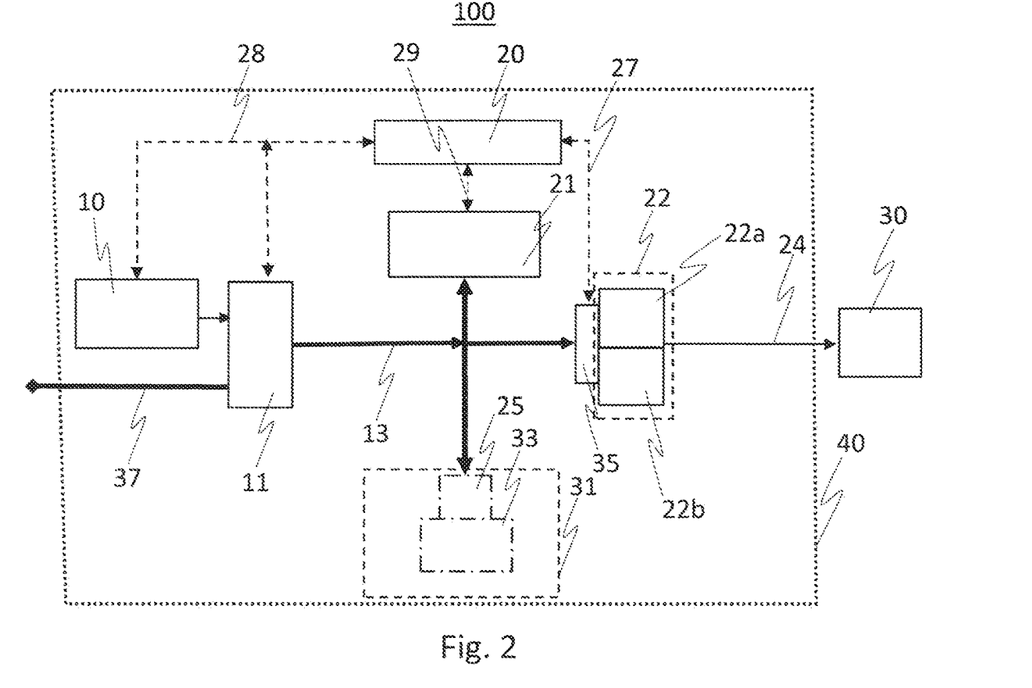
Figure 3:
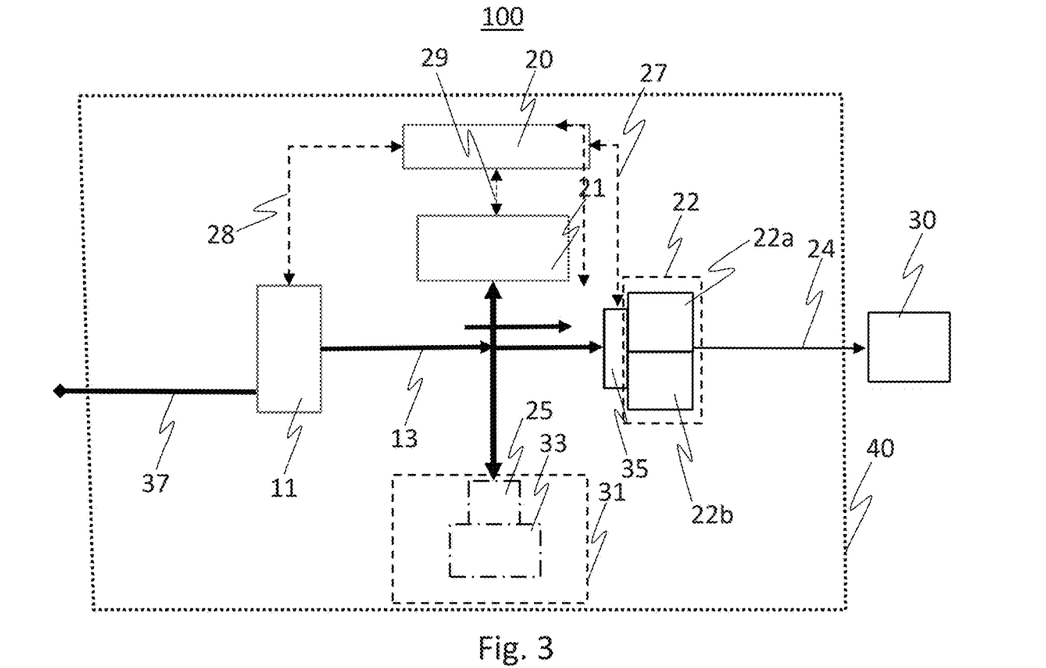

FIGS. 1-3 depict some functional elements of an exemplary power system 100 according to the invention for supplying AC output power to the coupled AC load 30. The examples of FIGS. 1-3 differ each other only in regard how the DC power is produced. Therefore, they all share the same inventive idea that is described below in the example of FIG. 1. The examples of FIGS. 2-3 concern mainly with differing solutions of the DC power (electric power) production.

In FIG. 1 depicted example the power system 100 advantageously comprises an engine generator 10, a charging unit 11, an internal DC bus 13, a controller 20, an energy measurement device 21, an inverter unit 22 and a battery circuitry 31.

The engine generator 10 is connected to and controlled by the controller 20. The engine generator is a combination of an electrical generator and an engine (prime mover) mounted together to form a single piece of equipment for generating electric power. The engine can be any type of internal combustion engine that rotates an output shaft, or the like, when enabled. In some embodiments (not shown in the figures) the engine generator 10 includes a fuel supply, a constant engine speed regulator (governor) and a generator voltage regulator, cooling and exhaust systems. In some embodiments the engine generator 10 may have own battery and electric starter motor. In some embodiments the engine of the engine generator 10 may be started with opening a throttle and providing electric power from the battery circuitry 31 to the stator of the generator to rotate the output shaft of the engine.

The electrical generator converts kinetic (i.e. mechanical) energy transferred via the output shaft, or the like, of the engine into electric power. The generated electric power is then rectified in the charging unit 11 into the DC power. The internal DC bus 13 transfers in the charging unit 11 rectified DC power to one or both of the battery circuitry 31 and inverter unit 22.

The inverter unit 22 inverts the DC power received from one or both of the charging unit 11 and battery circuitry 31 to the AC power to be supplied to the AC load 30.

The situation wherein the DC power is delivered from both the charging unit 11 and battery circuitry 31 is for instance when the AC output power demand is so high that the existing wattage of the battery circuitry 31 and the wattage provided by the engine generator 10 is not solely adequate to supply the DC power to the inverter unit 22. In the inverter unit 22 inverted AC power is then supplied to at least one AC load 30 via an AC output line 24. The AC output line 24 is configured to transfer the inverted AC output power to the AC load 30. The AC load 30 is connected to the system 100 for example via common AC outlet means.

The internal DC bus 13 transfers electric power between the charging unit 11, battery circuitry 31 and inverter unit 22. The internal DC bus 13 is further connected to the electric measurement device 21. The controller 20 controls and is coupled to the electric measurement device 21, enabling the electric measurement device 21 to measure values of electrical currents and/or voltages selectively from the internal DC bus 13 and from the internal DC bus 13 connected charging unit 11, battery circuitry 31 and inverter unit 22.

The internal DC bus 13 is connected to a battery connector 25 of the battery circuitry 31. The battery connector 25 is further configured to attach at least one battery 33, respectively, in order to the battery circuitry 31 to be charged by the charging unit 11 and to be discharged via supplying DC power to the inverter unit 22. The battery circuitry 31 comprises advantageously at least one battery connector 25 and at least one battery 33 connected to the battery connector 25 as depicted in the example of FIGS. 1-3.

In some embodiment the battery circuitry 31 may contain a regulator circuit to stabilize DC output from the battery circuitry 31. In the battery circuitry 31 the batteries 33 can be coupled in series/or in parallel. In some embodiments the batteries 33 can be placed outside of the housing 40 of the system 100. In some embodiments the batteries 33 are placed within the housing 40 of the system 100.

In some embodiments the battery circuitry 31 comprises mutual battery charging, discharging and protection circuitry for the connected batteries 33. In some embodiments, one or more of the batteries 33 include separate battery charging, discharging and protection circuitry.

The energy measurement device 21 is configured to measure battery circuitry 31 and therein included batteries 33. The controller 20 takes measured values from the energy measurement device 21 as an input for determining state of the battery circuitry 31 and/or individual connected batteries 33.

In some embodiment the energy measurement device 21 is connected to the AC line 24. The energy measurement device 21 is then configured to measure electrical currents and/or voltages from the AC line 24.

In some embodiment the energy measurement device 21 is connected to the inverter unit 22. The energy measurement device 21 is then configured to measure electrical currents and/or voltages from the inverter unit 22.

Based on measured values of electrical currents and/or voltages measured from at least one measurement location selected from the battery circuitry 31, the engine generator 10, the internal DC bus 13, the inverter unit 22 or the AC output line 24, the AC output power demand can be determined.

Based on at least one type of status of the battery circuitry 31 selected from battery state of charge (SoC), battery nominal capacity, battery physical condition, battery chemistry or battery voltage and/or AC output power demand, temperature measurements and preferences set by the user, i.e. user settings, of the system 100, the controller 20 can start up the engine generator 10 to provide the DC power to charge the battery circuitry 31 and/or supply the DC power to the inverter unit 22.

In the example of FIG. 1 the controller 20 controls the engine generator via DC power control 28. The DC power control 28 is configured to signal transferring between the controller 20 and the engine generator 10 and the charging unit 11. This signal transferring can be utilised by wired or wireless means known in the art.

A controlling of the engine generator 10 includes for instance starting, throttle adjusting and turning-off (i.e. shutdown) the engine of the engine generator 10.

The controller may control also the charging unit 11. This comprises controlling output power and voltage of the charging unit 11 so that optimal energy efficiency of the production of the electric power is obtained. In the example of FIG. 1 this basically means the highest possible charging power delivered (i.e. transferred) to the battery circuitry 31 (depending on its characteristics) and/or to the inverter unit 22 with lowest feasible engine speed of the engine generator 10. By minimising the runtime of the engine generator 10 may be enabled significant savings in fuel consumption of the engine generator 10.

The controller 20 may also continuously monitor the state of the battery 33, or batteries 33 if more than one battery is attached to the system 100, of the battery circuitry 31. For instance, a depth of discharge (DoD) or state of charge (SoC) can be calculated by using a coulomb counter and voltage measurements actuated by the electric measurement device 21. As a result, the controller 20 can present the energy available in battery circuitry in ampere hours or watt hours. Alternatively, the voltage of the battery circuitry 31 can be presented in other general ways known in the art.

In some embodiment the controller determines how long the AC power supply to the AC load 30 can be supplied without using the engine generator 10 with existing resources of the battery circuitry 31. This means for instance determining if existing battery SoC is adequate to supply AC power over predetermined time interval without usage of the engine generator or other energy source charging.

The controller 20 controls the electric power consumption of the inverter unit 22. In the examples of FIG. 1-3 the inverter unit 22 comprises two separate inverters, a low-level inverter 22a and high-level inverter 22b.

The controller uses AC output modes in controlling the inverter unit 22, 22a, 22b. The controller 20 determines/selects an AC output mode of the inverter unit (22) based on the AC output power demand. The selecting of the AC output mode is made between low-level mode and high-level mode on the basis of a threshold value. The low-level mode is selected when the AC output power demand is below the threshold value. The high-level mode is selected when the AC output power demand is above the threshold value.

In the low-level mode the low-level inverter 22a is used to supply the AC output power. In advantageous embodiment the system 100 supplies limited AC output power in the low-level mode.

In the high-level mode the high-level inverter 22b is used to supply the AC output power. In advantageous embodiment the system 100 supplies unlimited AC output in the high-level mode.

The low-level inverter 22a is configured to supply continuous AC output with limited wattage in order to reduce the idle current of the low-level inverter 22a. The limited wattage level can be adjusted to such that the low-level inverter 22a can supply continuously the AC load intended to be supplied in the low-level mode. In some embodiment the low-level inverter 22a is additionally configured to supply higher output than the nominal wattage of the low-level inverter 22a for short period of time to secure the AC output power supply when changing the AC output mode, i.e. in switch over phase of the AC output mode.

The high-level inverter 22b is configured to supply continuous AC output. In advantageous embodiment the high-level inverter 22b is configured to output as high wattages as for example modern appliances require. Because the high-level inverter 22b is configured to supply AC output power only when the threshold value is exceeded the idle-current consumption is not necessarily required to be optimised.

The threshold value that determines the mode of the AC output is used can be set by the controller 20 and/or by the user of the power system 100. In some embodiments an AI component of the controller software can be utilised, for instance, to minimise the activation of high-level mode. The threshold may depend on for example configuration of the system 100 and/or typical or average user.

It is possible to set hysteresis between the low-level mode and the high-level mode to prevent unfavourable swapping of the modes when the AC output power demand is fluctuating near the set threshold value.

In some embodiment the software product may comprise an AI component configured to the controller 20 to adjust the threshold value determining the AC output mode. This decision criteria may be done based on the system configuration and assumptions of the use and need of high-level AC output mode.

In the examples of FIGS. 1-3 the system 100 comprises a switching element 35. The controller 20 controls the switching element 35 via inverter control 27. The inverter control 27 is configured to signal transferring between the controller 20 and the switching element 35. This signal transferring can be utilised by wired or wireless means known in the art.

When the low-level mode is selected the controller 20 controls the switching element 35 to switch on and connect the low-level inverter 22a on the AC output line 24 and switch off and disconnect the high-level inverter 22b from the AC output line 24.

When the high-level mode is selected the controller 20 controls the switching element 35 to switch on and connect the high-level inverter 22b on the AC output line 24 and switch off and disconnect the low-level inverter 22a from the AC output line 24.

In some embodiments when the high-level mode is selected the low-level inverter is remained switch-on state when disconnected from the AC output line 24.

When the system 100 is turned on for supplying AC output to at least one desired AC load 30 the system 100 can be either in low-level mode or in high-level mode by default. The default mode can be set by the user. The system 100 is configured to supply continuous AC output power in both low-level and high-level AC output mode.

When the AC output mode is changed into another mode, i.e. switch over phase, e.g. from the low-level mode to the high-level mode, the inverter that will be disconnected is disconnected from the AC output line 24 after stabilisation of the inverter connected on the AC output line 24, i.e. when the connected inverter is ready to supply AC output power.

In some embodiments the system may comprise more than one high-level inverter 22b. In such embodiments the high-level inverters 22b are configured to mutually supply scaled up AC output power. The controlling of more than one high-level inverter 22b can be done similarly as described above in the case of the one high-level inverter 22b.

The example of FIG. 2 is similar than the example of FIG. 1 but comprises also an energy source connector 37 connected to the charging unit 11 to at least one energy source selected from renewable energy sources of a solar panel, wind turbine or hydroelectric power generator or the like, respectively.

In some embodiments to the energy source connector 37 can be attach an AC input from the electric grid with or without the renewable energy source.

The energy source connector 37 is configured to transfer the electric power from the attached renewable energy source to the charging unit 11. The charging unit 11 is further configured to modify currents and voltages of and/or rectify the electric power originated from the attached renewable energy source to be suitable for the transferring to one or both of the battery circuitry 31 and the inverter unit 22 via the internal DC bus 13.

Embodiments where the system comprises the AC input the system can be used as a back-up electric system. This kind of back-up electric system may be configured to operate automatically. Therefore, the system may comprise a transfer switch that senses within seconds the power outage of the electric grid and the controller 20 commands the system 100 to supply AC output power to the AC load 30. After utility power returns, the transfer switch transfers the electric load back to the utility and the controller 20 may signal the engine generator 10 to shut off. The system 100 then returns to standby mode where it awaits the next outage.

The example of FIG. 3 is similar than the example of FIG. 2 but comprises only the energy source connector 37 to provide electric power to the system 100. This example may be suitable for the use of the system 100 where there is the AC input connected or there is sufficiently enough renewable energy available to provide solely all required electric power and wherein the system 100 comprises sufficiently large battery resources.

The controller 20 may also comprise a network interface that can be utilised for example to apply weather forecast data as a part of optimisation procedure. If renewable energy is forecasted to be available after night-time, it is possible to postpone engine generator-based charging, in example of 2, and fully utilise the renewable energy source when it is again available. For this procedure user patterns can also be utilised by SW of the controller.

Figure 5:
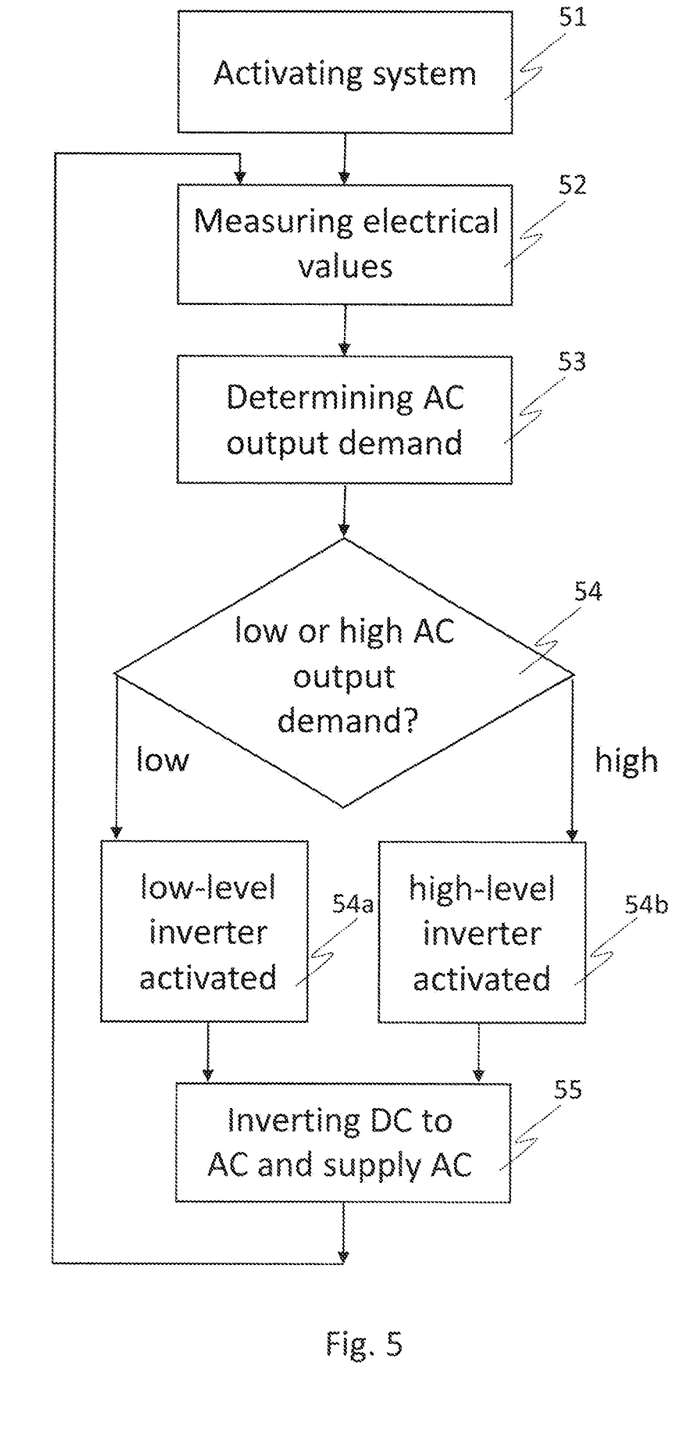
FIG. 5 shows in an exemplary flow chart main steps of an exemplary method according to the invention.

FIG. 5 depicts an example flow diagram of the method for supplying AC output to at least one desired AC load 30 wherein the controller 20 controls the electrical energy consumption of the inverter unit 22 based on the AC output power demand.

In the depicted flow diagram of FIG. 5 and corresponding description the actual controlling of the supplying AC output to at least one desired AC load 30 is accomplished in the controller 20 that belongs to the power system 100 according to the invention.

In step 51 the power system 100 is activated, i.e. turned on, for supplying AC output. In step 52 the energy measurement device 21 measures electrical currents and/or voltages from the internal DC bus 13.

In step 53 the controller receives the measured values from the energy measurement device 21 as an input for determining an AC output power demand.

In step 53 the controller may also select energy source, i.e. the engine generator 10 or electric power transferred via the energy source connector 37, and/or the battery circuitry 31 to provide DC power to be delivered via the internal DC bus 13 to the inverter unit 22.

In step 54 the controller controls the inverter unit 22 based on the AC output power demand.

If the decision in step 54 is "low", i.e. the AC output power demand is below the threshold value, then the low-level inverter 22a is activated, i.e. switched on and connected to the AC output line 24, in step 54a. Respectively in step 54a, the high-level inverter 22b is deactivated, i.e. switched off and disconnected from the AC output line 24.

If the decision in step 54 is "high", i.e. the AC output power demand is above the threshold value, then the high-level inverter 22b is activated, i.e. switched on and connected to the AC output line 24, in step 54b. Respectively in step 54b, the low-level inverter 22b is deactivated, i.e. switched off and disconnected from the AC output line 24.

In step 55 in the inverter that was activated in the previous step, i.e. in step of 54a or 54 b, inverts the DC power received via the internal DC bus 13 to the AC power to supply AC output.

Figure 4:
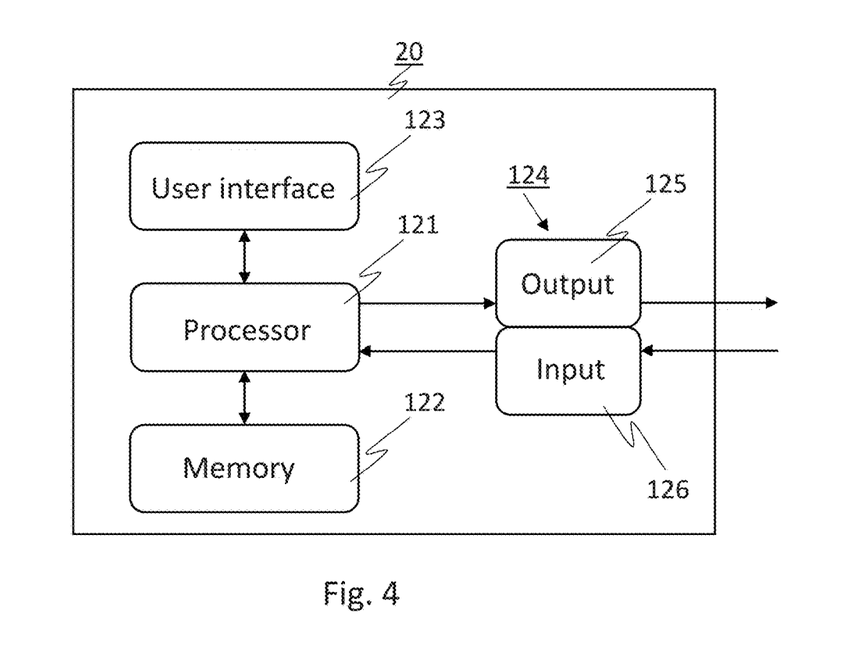
FIG. 4 shows functional elements of a controller utilised in the implementation of the system according to the invention.

FIG. 4 shows functional main elements or parts of the controller 20 in the implementation of the method utilised for supplying AC output or belonging to the power system 100 according to the invention. The controller 20 comprises a processor or processor means 121, which advantageously comprise an arithmetic logic unit, a number of different registers and control circuits. A data storing arrangement 122, such as a memory unit, computer readable medium, non-transitory medium or memory means, whereon computer-readable information, programs or mechanical structure data can be stored, has been connected to the processor means 121. The memory means 122 typically contain memory units, which allow both reading and writing functions (Random Access Memory, RAM), and memory units containing non-volatile memory, from which data can only be read (Read Only Memory, ROM) or SSD (Solid State Drive) and the like.

The controller 20 may also comprise an interface element 124, which comprises an input or input means 126 for receiving data from the network interface or commands from the user. The data received with the input means 126 is advantageously transferred to be processed by the processor means 121 of the controller 20.

The interface element 124 also comprises an output or output means 125, with which utilised different kind measurement data of the measurement device 21 is transferred from the processor means 121 and with which the processor means 121 can advantageously send status information of the system 100 to the user of the system 100, for example.

The controller advantageously also comprises a user interface 123, which comprises means for receiving data and/or control commands from the user of the system 100. The user interface 123 can also be used for entering control commands to the power system 100 as well as for controlling the electrical energy consumption of the inverter unit 22, such as via adjusting the threshold value, and controlling the connected/attached energy sources. The user interface 123 can for example comprise a keyboard, a touch screen, a microphone and a speaker. The user interface 123 can be an application used via the smartphone, smartwatch and the like.

The processor means 121, the memory means 122, the interface element 124 and the user interface 123 are electrically connected together to systematically execute received and/or stored data or information in accordance with predetermined and substantially pre-programmed operational sequences. Such operational sequences also include the operational sequences of a computer program product by which the depicted method steps of FIG. 5 by which a supply of AC output power and electric power consumption of the inverter unit 22 are accomplished.

Some advantageous embodiments of the system, method and computer program according to the invention have been described above. The invention is not limited to the embodiments described above, but the inventive idea can be applied in numerous ways within the scope of the claims.

REFERENCE NUMERALS

10 engine generator
11 charging unit
13 internal DC bus
20 controller
21 energy measurement device
22 inverter unit
22a low-level inverter
22b high-level inverter
23 switching element
24 AC output line
25 battery connector
27 inverter control
28 DC power control
30 AC load
31 battery circuitry
33 battery
35 switching element
37 energy source connector
40 housing
100 power system

The invention claimed is:

1. A method for supplying AC output power to at least one desired AC load, the method comprising:
    measuring values of electrical currents and/or voltages by an energy measurement device within a power system;
    taking measured values from the energy measurement device as an input and determining an AC output power demand of the AC load connected to an inverter unit by a controller;
    inverting DC power transferred via an internal DC bus to AC power by the inverter unit to supply the AC output power, which internal DC bus is configured to electric transfer within the system; and
    providing a switching element controlled by the controller;
    wherein the controller accomplishes a step of controlling electric power consumption of the inverter unit based on the AC output power demand,
    wherein the controller accomplishes a step of selecting of AC output mode of the inverter unit based on the AC output power demand, wherein the selecting of the AC output mode is made between a low-level mode and a high-level mode on the basis of a threshold value, wherein the low-level mode is selected when the AC output power demand is below the threshold value and the high-level mode is selected when the AC output power demand is above the threshold value, and
    wherein the switching element accomplishes a step of connecting the low-level inverter on the AC output line and disconnecting the high-level inverter from the AC output line, when selecting the low-level mode, which low-level inverter and high-level inverter are separate inverters, and which switching element accomplishes a step of connecting the high-level inverter on the AC output line and disconnecting the low-level inverter from the AC output line, when selecting the high-level mode.

2. The method according to claim 1, wherein the method further comprising a step of selecting at least one energy source and/or a battery circuitry to provide the DC power to be transferred via the internal DC bus to the inverter unit, wherein the selecting is made based on the AC output power demand and/or status of the battery circuitry.

3. The method according to claim 1, wherein the method further comprising a step wherein providing at least one energy source, which is an engine generator, wherein when running the engine generator the method comprising steps of:
    converting kinetic energy into electric power by the engine generator;
    rectifying the electric power generated by the engine generator to the DC power by a charging unit; and
    transferring the rectified DC power originated from the engine generator to one or both of the battery circuitry and the inverter unit.

4. The method according to claim 1, wherein the method further comprises: providing at least one energy source connector to attach an AC input from the electric grid and/or at least one energy source selected from a solar panel, wind turbine, hydroelectric power generator, respectively, to provide electric power;
    transferring electric power received via the energy source connector to a charging unit;
    rectifying electric power originated via the energy source connector to the DC power by the charging unit; and
    transferring the rectified DC power originated via the energy source connector to one or both of the battery circuitry and the inverter unit.

5. The method according to claim 1, wherein the controller accomplishes a step of adjusting the threshold value.

6. The method according to claim 1, wherein the switching element accomplishes a step of switching off the high-level inverter, when selecting the low-level mode, and a step of switching on by the switching element the high-level inverter when selecting the high-level mode.

7. The method according to claim 1, wherein the switching element accomplishes a step of switching on the low-level inverter and switching off the high-level inverter, when selecting the low-level mode, and a step of switching on the high-level inverter and switching off the low-level inverter, when selecting the high-level mode.

8. The method according to claim 1, wherein measuring electrical currents and/or voltages within the system comprises a measurement from at least one measurement selected from a battery circuitry, an energy source, the internal DC bus, the inverter unit, the switching element or the AC output line.

9. A power system for supplying AC output power to at least one desired AC load, the system comprising:
   an internal DC bus configured to electric transfer within the system;
   an inverter unit coupled to the internal DC bus, which inverter unit is configured to invert DC power to AC power to supply the AC output power to the inverter connected AC load;
   an energy measurement device coupled to the internal DC bus, wherein the energy measurement device is configured to measure values of electrical currents and/or voltages within the system; and
   a controller configured to take measured values from the energy measurement device as an input for determining an AC output power demand of the AC load connected to the inverter unit,
   wherein the controller is further configured to control electric power consumption of the inverter unit based on the AC output power demand,
   wherein the controller is further configured to control the inverter unit to operate at least in a low-level mode and in a high-level mode, and
   wherein the inverter unit comprises a low-level inverter configured to invert the DC power to the AC power in the low-level mode, which low-level mode is configured to be used when the AC output power demand is below threshold value, and the inverter unit further comprises a high-level inverter configured to invert the DC power to the AC power in the high-level mode, which high-level mode is configured to be used when the AC output power demand is above the threshold value, and which low-level and high-level inverter are separate inverters.

10. The power system according to claim 9, wherein the system further comprises at least one energy source which is an engine generator configured to provide electric power by conversion from produced kinetic energy.

11. The power system according to claim 9, wherein the system further comprises at least one energy source connector configured to attach an AC input from the electric grid and/or at least one energy source selected from a solar panel, wind turbine or hydroelectric power generator, respectively, to provide electric power, which energy source connector is configured to electric transfer to the charging unit.

12. The power system according to claim 10, wherein the system further comprises a charging unit coupled to at least one energy source and/or the AC input, which charging unit is configured to rectify at least from one energy source and/or the AC input transferred electric power to the DC power and supply the rectified DC power to the internal DC bus.

13. The power system according to claim 10, wherein the controller is configured to take measured values from the energy measurement device as an input for controlling the engine generator and/or for controlling power and voltage of the rectified DC power.

14. The power system according to claim 9, wherein the system further comprises a battery circuitry which comprises at least one battery connector configured to attach at least one battery, respectively, to charge and discharge the battery circuitry.

15. The power system according to claim 9, wherein the internal DC bus is configured to electric transfer between the inverter unit, a battery circuitry and a charging unit.

16. The power system according to claim 9, wherein the system further comprises a switching element configured to be controlled by the controller, which switching element is further configured to connect the low-level inverter on the AC output line, when the low-level mode is selected, and disconnect by the switching element the low-level inverter from the AC output line, when the high-level mode is selected, the switching element is further configured to connect the high-level inverter on the AC output line, when the high-level mode is selected, and disconnect by the switching element the high-level inverter from the AC output line, when low-level mode is selected, which AC output line is configured to transfer the inverted AC output power to the connected AC load.

17. The power system according to claim 9, wherein a switching element is further configured to switch on the low-level inverter, when low-level mode is selected, and switch off by the switching element the low-level inverter, when the high-level mode is selected, and/or switch on by the switching element the high-level inverter, when the high-level mode is selected, and switch off by the switching element the high-level inverter when the when low-level mode is selected.

18. A computer program product on a non-transitory media for supplying AC output power to at least one desired AC load, comprising instructions configured to, when executed on at least one processor, cause the at least one processor to perform method steps, the method steps comprising:
   receiving measured values of electrical currents and/or voltages of a power system from an energy measurement device as an input;
   determining an AC output power demand of an AC load connected to an inverter unit;
   controlling an inverter unit in inverting of DC power received via an internal DC bus to AC power to supply the AC output power, the internal DC bus is configured to electric transfer within the system;
   controlling a switching element;
   controlling electric power consumption of the inverter unit based on the AC output power demand; and
   selecting of AC output mode of the inverter unit based on the AC output power demand, wherein the selecting of the AC output mode is made between a low-level mode and a high-level mode on the basis of a threshold value, wherein the low-level mode is selected when the AC output power demand is below the threshold value and the high-level mode is selected when the AC output power demand is above the threshold value;
   wherein the switching element accomplishes a step of connecting the low-level inverter on the AC output line and disconnecting the high-level inverter from the AC output line, when selecting the low-level mode, which low-level inverter and high-level inverter are separate inverters, and which switching element accomplishes a step of connecting the high-level inverter on the AC output line and disconnecting the low-level inverter from the AC output line, when selecting the high-level mode.

* * * * *